Sept. 21, 1948.    L. R. BUCKENDALE ET AL    2,449,546
POWER TRANSMITTING MECHANISM Filed Jan. 24, 1944    4 Sheets-Sheet 1

Inventors
Lawrence R. Buckendale and
Beverly W. Keese,

By Strauch & Hoffman
Attorneys

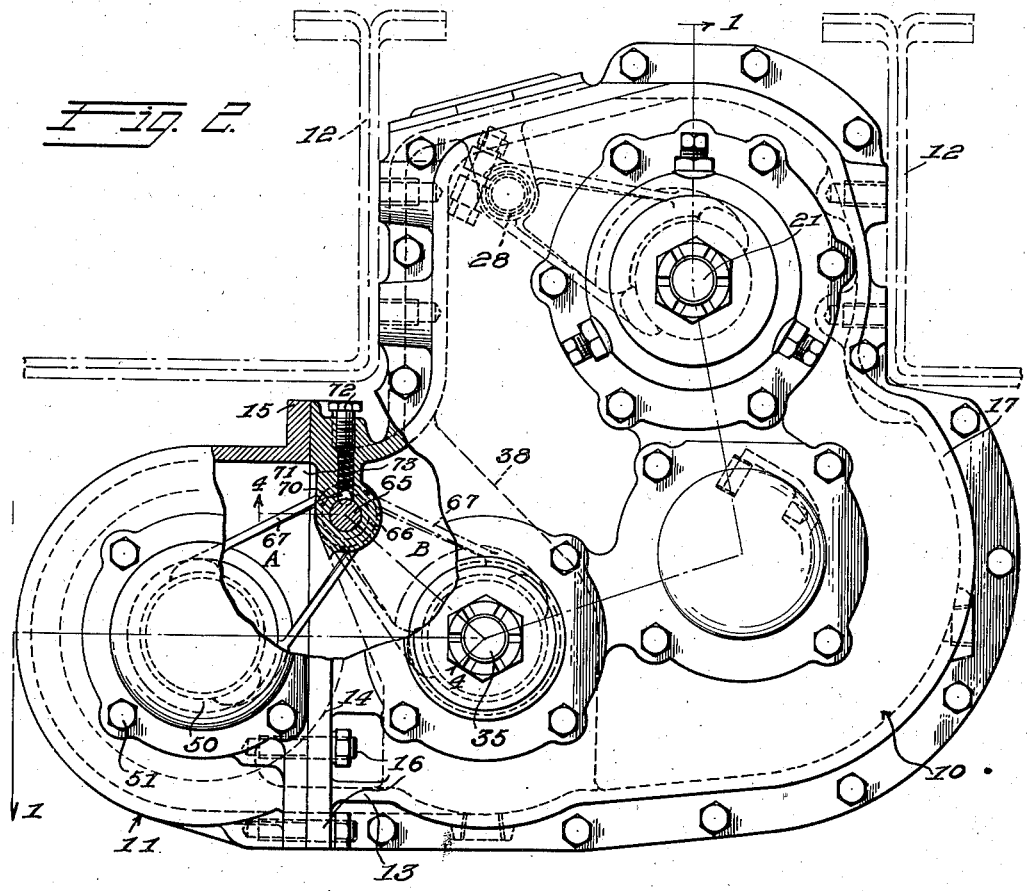

Sept. 21, 1948. L. R. BUCKENDALE ET AL 2,449,546
POWER TRANSMITTING MECHANISM
Filed Jan. 24, 1944 4 Sheets-Sheet 3
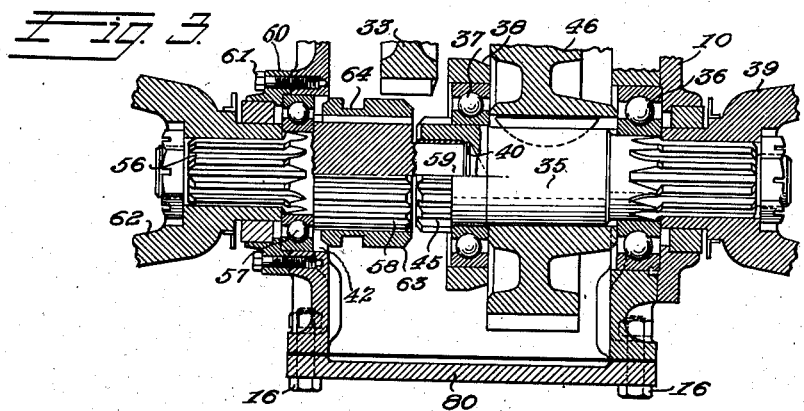
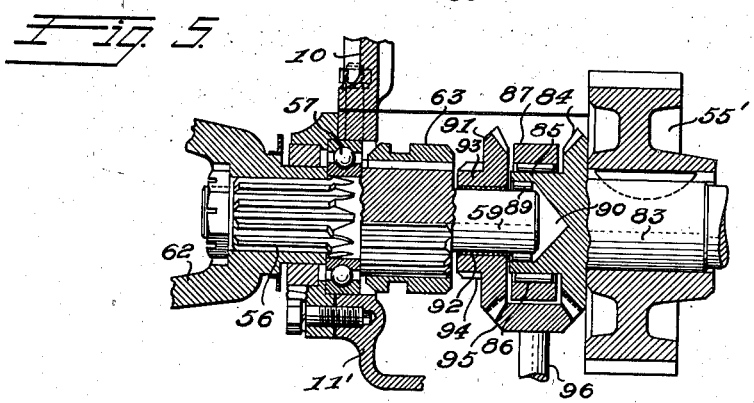
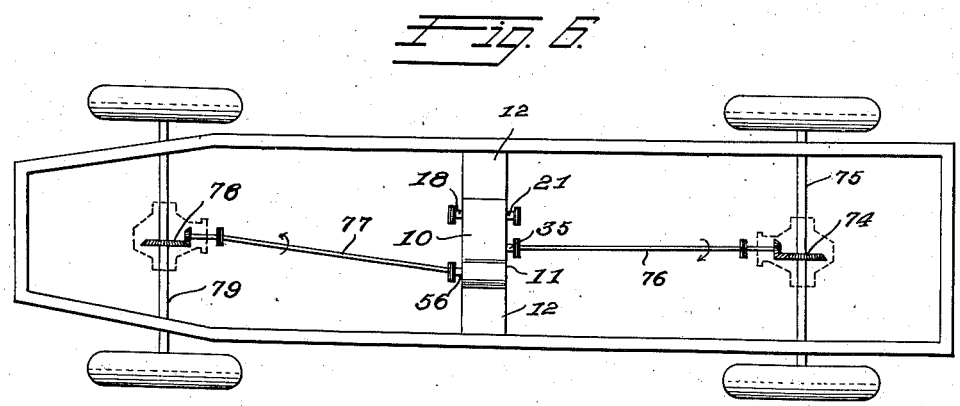
Inventors
Lawrence R. Buckendale and
Beverly W. Keese,
By Strauch & Hoffman
Attorneys

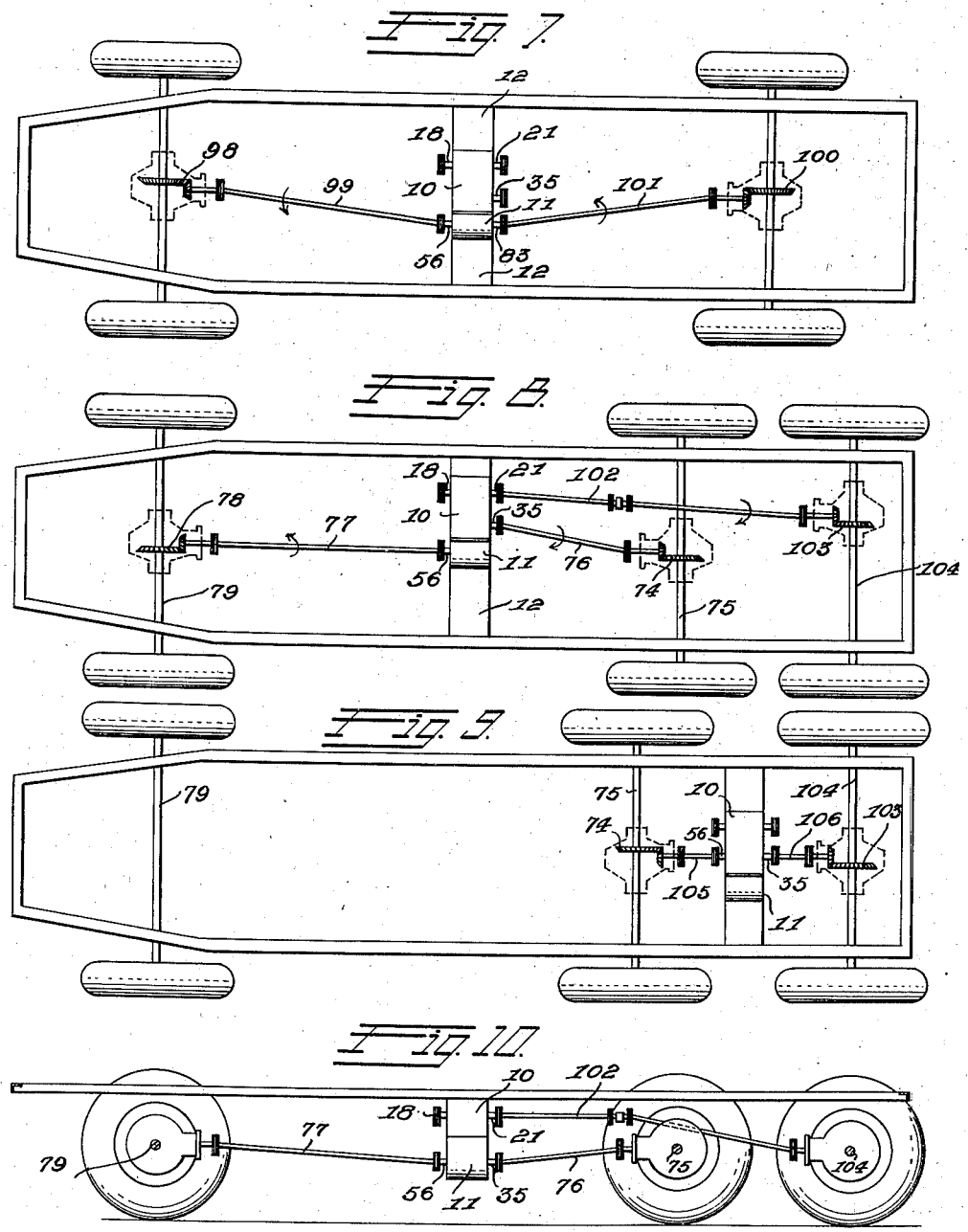

Patented Sept. 21, 1948

2,449,546

UNITED STATES PATENT OFFICE 2,449,546

POWER TRANSMITTING MECHANISM

Lawrence R. Buckendale, Detroit, Mich., and Beverly W. Keese, Oshkosh, Wis., assignors to The Timken-Detroit Axle Company, Detroit, Mich., a corporation of Ohio Application January 24, 1944, Serial No. 519,508

11 Claims. (Cl. 74—343)

This invention relates to power transfer mechanism, and more particularly to a convertible, multiple axle drive mechanism and has for its general object and purpose to provide certain important practical improvements in a power transmitting mechanism of the type disclosed in United States Letters Patent No. 2,399,201 issued April 30, 1946.

More particularly our present invention, in the embodiments which we have selected for the purpose of illustration, is incorporated as a part of a vehicle driving mechanism which transmits power from an engine or other prime mover to the drive gearing of a plurality of spaced vehicle axles so that the road engaging wheels thereof will be positively driven.

Some standard vehicle driving axles are constructed with the differential ring gear and driving pinion of the hypoid type while others have the conventional type bevel gearing in which the engaged gear elements rotate about intersecting axes. In the use of hypoid gearing, in which the gear elements rotate about non-intersecting, non-parallel axes, it is now common practice, in four-wheel drive vehicles, to invert the position of the gear assembly in the front axle with respect to the position of the gear assembly in the rear axle by turning the former in a vertical plane through 180° or a half circle. The axis of the drive pinion is thereby positioned in a plane above the axis of the front axle while the rear drive pinion has its axis in a plane below the axis of the rear vehicle axle at relatively opposite sides of the respective axles. This arrangement necessitates the provision of means in the power transfer gearing for rotating the respective drive pinion shafts in relatively opposite directions. On the other hand, when the conventional bevel gearing is used in each axle the drive pinion shafts are rotated in the same direction.

It is, therefore, one of the important objects of our invention to provide a power transfer or driving mechanism for multiple drive axle vehicles which may be easily and quickly converted, by certain simple adjustments and without employing additional elements, for use in efficiently transmitting power to either standard type of axle drive gearing above described. In said patent we have shown a power transfer mechanism in which the power output shafts, respectively connected with front and rear axle drive pinions, are mounted in axial alignment, together with the power input shaft and connecting gearing, in a common housing structure. However, it has also been proposed to arrange said output shafts with their axes in non-coinciding, spaced apart relation, and, although we have herein illustrated the latter arrangement, it is contemplated that the present improvements may be applied to a transfer mechanism embodying either of said output shaft arrangements.

Another object of the invention resides in the provision of a supplemental, demountable housing for the front axle drive output shaft and its associated gearing together with means whereby said output shaft may be alternatively mounted in said housing or in the main housing structure in axial alignment with a rear axle output shaft mounted in said main housing. In the latter case the supplemental housing is replaced by a cover plate for the open side of the main housing. However, when axially aligned output shafts are mounted in the supplemental housing the latter may remain in attached position and one of said shafts utilized for driving a third axle, if desired, or for use as a power take-off to drive an auxiliary machine.

A further object of the invention is to provide clutch means for connecting the output shaft for the front axle with an aligned countershaft in said supplemental housing (or with an aligned output shaft therein for the rear axle) said clutch means including a single shiftable clutch member, and means for shifting said clutch member, when the front axle output shaft is so arranged or when it is alternatively mounted on the main housing in aligned relation to the rear axle output shaft therein, to establish or disestablish a driving relation between said aligned shafts.

An additional object of our invention is to provide a convertible multiple axle drive mechanism as above characterized which will also possess the several advantages of the construction disclosed in said patent in that it is easily adaptable for application to many different types of multiple drive axle vehicles, comprises a comparatively small number of compactly arranged, ruggedly constructed elements and provides means for the adequate lubrication of all relatively movable parts.

Other subordinate objects will become apparent from the following description and appended claims, when considered in connection with the annexed drawings, illustrating a selected practical embodiment of our invention and several desirable applications thereof to multiple drive axle vehicles.

In the drawings, in which similar reference characters indicate corresponding parts throughout the several views:

Figure 2 is an end elevation of the right hand side of the power transfer case shown in Figure 1, supported between suitable hangar brackets on the vehicle frame, the housing structure being partly broken away and certain of the parts shown in section;

Figure 3 is a fragmentary sectional view similar to Figure 1, showing the alternative mounting of the power output shaft for the front axle in axial alignment with the output shaft for the rear axle when the conventional bevel type axle gearing is used;

Figure 4 is a horizontal sectional view taken substantially on the line 4—4 of Figure 2 showing the means for shifting the shaft connecting clutch member in both positions of the power output shaft for the front axle;

Figure 5 is a fragmentary sectional view similar to Figure 3 showing aligned front and rear power output shafts mounted in the supplemental housing;

Figure 6 is a diagrammatic plan view illustrating an application of the transfer case of Figure 1 to a four-wheel drive vehicle;

Figure 7 is a similar view showing the reversed arrangement of the hypoid axle drive gearing for use in connection with the transfer case of Figure 5;

Figure 8 is a view similar to Figure 6, the invention being applied to a six-by-six vehicle drive;

Figure 9 is a view similar to Figures 6 and 8 in which the invention is applied to a six-by-four vehicle drive;

Figure 10 is a diagrammatic longitudinal section of the arrangement shown in Figure 8.

Figure 1:
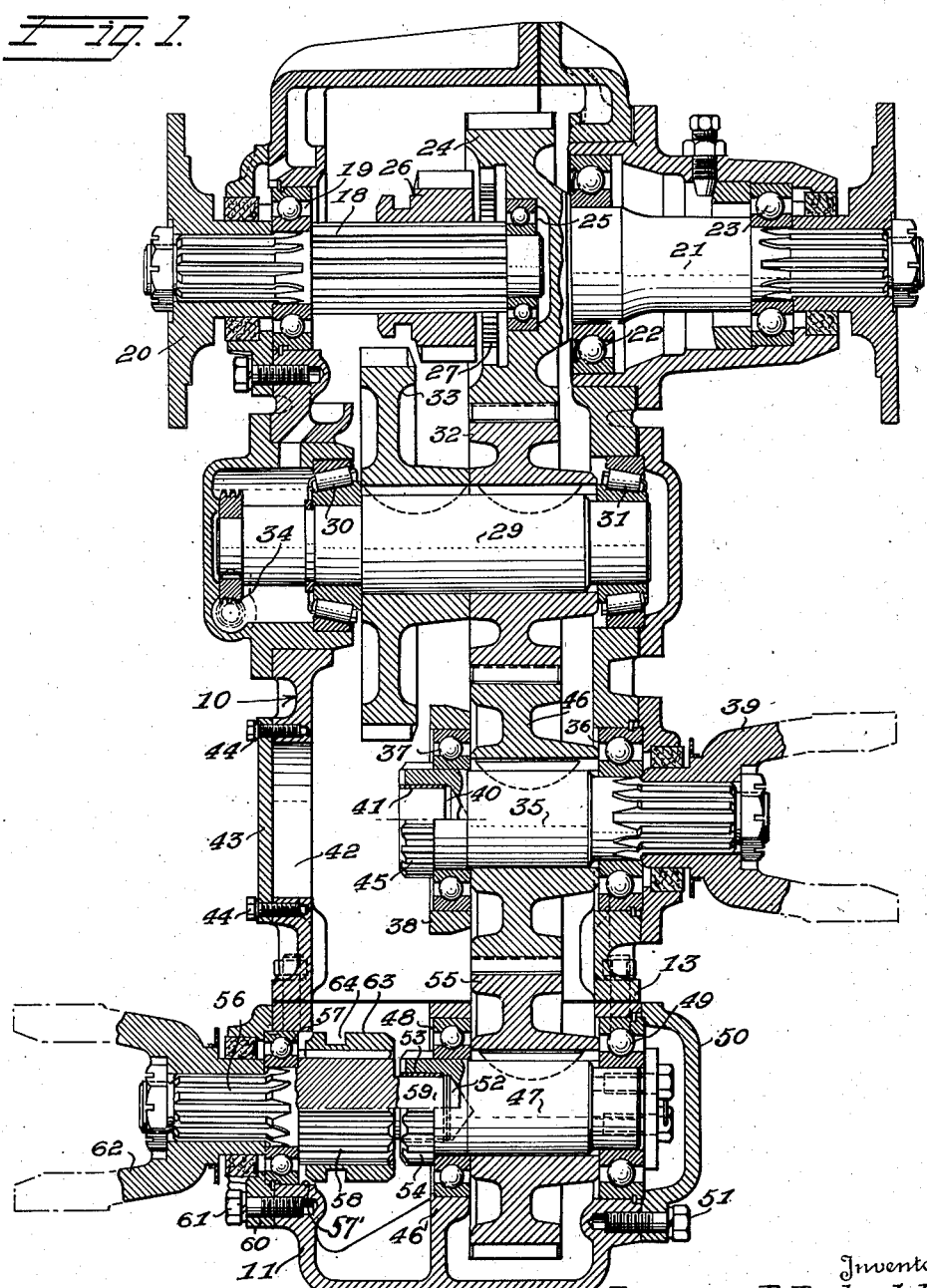
Figure 1 is an irregular sectional view taken substantially on the line 1—1 of Figure 2 looking in the direction of the arrows.

With reference more particularly to Figures 1 to 4 of the drawings, the power transfer mechanism of this invention is operatively mounted upon and enclosed within a housing structure. In the illustrated embodiment of the invention this structure preferably comprises a main housing 10 for certain parts of the mechanism and a supplemental housing 11 which independently carries certain other parts of said mechanism. The housing 10, modified in certain particulars, corresponds to the housing shown in our patent above identified and is vertically positioned in the vehicle frame and rigidly secured at its upper end, in well known manner, between suitably spaced hanger brackets 12. The housing 10 has a relatively short, transversely directed open lower end 13 formed with the flange 14 to which the mating flange 15 at the open side of the supplemental housing 11 is securely attached as indicated at 16. At its opposite side the housing 10 is also transversely enlarged or extended, as at 17 to accommodate certain of the gear elements to be later described.

In one side of the housing 10 the power input or driving shaft 18 is journalled in the bearing 19 and at its outer end is provided with the universal joint flange 20 for connection with the change speed transmission of the vehicle or other source of power. Upon the opposite side of the housing and in axial alignment with shaft 18, a power output shaft 21 is journalled in the spaced bearings 22, 23. This shaft at its inner end carries the fixed spur gear 24 which is axially recessed to receive the bearing 25 for the reduced inner end of the drive shaft 18. Upon the latter shaft a gear 26 is splined for sliding movement, the teeth thereof being adapted to engage internal teeth 27 formed on the gear 24, whereby shafts 18 and 21 are connected for unitary rotation at the same speed. The usual shifter mechanism generally indicated at 28, in Figure 2, is provided for shifting the gear 26.

Below the shafts 18 and 21 a countershaft 29 is journalled on opposite side walls of the housing 10 in bearings 30 and 31 respectively. This shaft carries the spur gears 32 and 33, keyed or otherwise fixed thereon. The smaller gear 32 is in constant mesh with the gear 24 of output shaft 21 while gear 33, of relatively large diameter, is adapted to be engaged by the teeth of the slidable gear 26 when the latter is shifted in one direction from its neutral position on shaft 18. Power will then be transmitted to the output shaft 21 at relatively low speed through the countershaft 29 and gear 32. One end of said countershaft may be connected with speedometer operating gearing, indicated at 34.

The above described gearing and the mounting and arrangement of shafts 18, 21 and 29 is substantially the same as that disclosed in said patent, the notable difference being that, in the present instance, the axis of countershaft 29 is located on the opposite side of a vertical plane intersecting the axes of shafts 18 and 21 with respect to the location of said countershaft in the patent. For this reason the housing enlargement 17 is necessary to accommodate the gear 33. For further details with respect to the mounting of the several gear carrying shafts and the means for supplying lubricant to the shaft bearings reference may be had to said patent.

In the lower open end of housing 10 a power output shaft 35 is journalled in the spaced bearings 36 and 37, the former being mounted in one side wall of the housing and the latter in a vertical web 38 which connects the top and bottom walls of the end portion 13 of said housing. One end of this shaft projects from housing 10 in the same direction as the output shaft 21 and is provided with the universal joint member 39. At its other or inner end which terminates within the housing, the shaft 35 is counterbored, as at 40, and provided with the bearing sleeve 41 for a purpose to be later explained. The side wall of the housing 10 which is opposed to this end of shaft 35 has an opening 42 therethrough closed at its outer end by a removable cover plate 43 detachably secured to the housing wall by stud bolts 44. The end of shaft 35 which extends beyond bearing 37 is externally formed with clutch teeth 45.

Between the bearings 36 and 37 a spur gear 46 is keyed or otherwise fixed on the shaft 35 and is in constant mesh with the gear 32 on the countershaft 29.

The housing 11 is internally divided by the web 46' and a countershaft 47 has its inner end journalled in this web by the bearing 48. A similar bearing 49 journals the outer end of said shaft in one side wall of the housing 11, said end of the shaft being covered by a cap plate 50 secured to the housing wall by stud bolts 51. The inner end of shaft 47 is counterbored, as at 52, and provided with the bearing sleeve 53 and with external clutch teeth 54, such parts being identical as to form and dimensions, with the corresponding parts at the inner end of output shaft 35 in the main housing 10. Between the bearings 48 and 49 a spur gear 55 is keyed or otherwise fixed on the countershaft 47.

In the other side wall of housing 11 a power output shaft 56 is journalled by the bearing 57. This shaft has an enlarged splined section 58 adjacent to said bearing and an inner terminal section 59 of reduced diameter rotatably supported in the bearing sleeve 53 of countershaft 47. The bearing 57 is retained in place by the usual cap plate 60 bolted to the housing, as at 61, and it will be noted that the bearing receiving opening in the wall of housing 11 and the opening 42 in the wall of housing 10 are of the same diameter. The outer end of the shaft 56 is provided with the universal joint member 62.

The clutch member 63 is internally splined for sliding coaction with the splined section 58 of shaft 56 and the clutch teeth 54 on the opposed end of countershaft 47 are of the same form and number as said splines. This clutch member has the usual annular groove 64 to receive the arms of the fork of the clutch shifting mechanism to be presently described.

When the invention is to be applied for transmitting power to hypoid type vehicle drive axles the supplemental housing 11 is attached to the open lower end of the main housing 10, as above explained, with the corresponding side walls of said housing in alignment. This operation automatically positions gear 55 on the countershaft 47 in proper meshing engagement with the gear 46 on the power output shaft 35 of the main housing 10.

The shifter mechanism for clutch member 63 is best shown in Figures 2 and 4 of the drawings and includes the usual shifter rod 65, axially movable through an opening in one side wall of the housing 10 at the flange 14 thereon and having its inner end supported in a bearing sleeve 66 formed on one side of the vertical web 38. Within the housing the shifter fork 67 is connected to the rod 65 by a suitable set screw 68. The rod 65 is provided with two diametrical bores, spaced apart substantially 45°, to selectively receive the inner end of the set screw 68 and hold the fork 67 in fixed relation to the shifter rod in either of the positions A or B with respect to the axis of said rod, as shown in Figure 2.

The inner end of shifter rod 65 is provided with the usual longitudinally spaced circumferential grooves 69 to receive the latching ball 70 in the lower end of an opening 71 extending vertically through an integral connection between the upper side of sleeve 66 and web 38. The adjusting screw 72 threaded in the upper end of said opening regulates the pressure of spring 73 on the ball 70 to latch the rod 65 in either of its shifted positions and yieldingly retain the clutch member 63 in its operative and inoperative positions.

From the above description it will be understood that when the housing 11 and mechanism carried thereby are assembled on the housing 10, shifter fork 67 is adjusted on rod 65 to the position A so that the arms thereof will be properly engaged in the groove 64 of clutch member 63. As shown in Figure 6 the output shaft 35 is connected with the drive pinion of hypoid gearing 74 in the rear vehicle axle 75 by the propeller shaft 76 and output shaft 56 is similarly connected by propeller shaft 77 with the drive pinion of the inverted hypoid gearing 78 in the front vehicle axle 79.

By shifting gear 26 to the right on drive shaft 18 (Figure 1) the teeth thereof are engaged with internal teeth 27 on gear 24 so that shaft 21 is driven at the same speed as the drive shaft. Through gears 32 and 46 rotation is transmitted from gear 24 to output shaft 35, in the same direction as drive shaft 18, to drive the rear vehicle axle through propeller shaft 76 and gearing 74. Gears 46 and 55 drive the countershaft 47 in a reverse direction with respect to output shaft 35 and drive shaft 18. Therefore, when shifter fork 67 is operated to engage clutch member 63 with the clutch teeth 54, output shaft 56 is rotated in the same direction as countershaft 47 and the inverted front axle hypoint gearing operated by propeller shaft 77 to drive said axle in the same direction as the rear axle for forward drive of the vehicle. Of course, the direction of vehicle drive is reversed in the usual way through the change speed transmission.

When gear 26 is shifted to the left from the neutral position shown in Figure 1 it is connected with gear 33 to drive the shafts 24, 35 and 47 at relatively low speed with respect to the drive shaft 18. While we have shown a 1 to 1 ratio of the individual elements in the gear train connecting shaft 24 with shaft 47 such ratio may be changed as desired to drive the shafts 35 and 47 at a different speed from the shaft 24 and also in relation to each other. When the vehicle is operated with light loads and it is not desired to drive the front axle it is only necessary to shift clutch member 63 to its inoperative position, shown in Figure 1, to disconnect the power output shaft 56 from countershaft 47, thus economizing in fuel consumption and tire wear.

The shaft 24 is provided for the purpose of driving a third vehicle axle, as will be later explained, but when the invention is applied to a four wheel drive vehicle this shaft may be utilized to operate a vehicle accessory or for other purposes.

When the vehicle axles are equipped with conventional bevel type differential gearing in which the drive pinion and ring gear rotate about intersecting axes, the housing 11 and mechanism carried thereby are dismounted from the housing 10. Bolts 61 are now removed and output shaft 56, together with clutch member 63 and bearing 57, are withdrawn through the opening 57' in the wall of housing 11. After removing cover plate 43 the end of shaft 56, with clutch member 63, is then inserted through the opening 42 in the wall of housing 11 and the pilot end 59 of said shaft fitted into the bearing sleeve 47 in the end of output shaft 35. Bearing 57 is properly mounted in opening 42 and the cap plate 60 secured to the wall of housing 11 to complete the assembly, whereby the output shafts 35 and 56 are positioned in housing 10 in axial alignment with each other, as seen in Figure 3 of the drawings.

After removing set screw 68, rod 65 is withdrawn sufficiently to disconnect shifter fork 67 therefrom. This fork is then arranged in the position B (Figure 2) and the arms thereof again engaged in the groove 64 of clutch member 63. The fork is now re-connected with shifter rod 65 and member 63 may be shifted to engage the clutch teeth 45 and connect the shafts 35 and 56 for unitary rotation in the same direction.

The lower open end of housing 10 is then closed by the cover plate 80 (Figure 4) secured to flange 14 thereof by the bolts 16. If desired, this flange may be provided with a number of locating dowels, indicated at 81, to be received in openings in the plate 80 and in flange 15 of the housing 11.

Referring now to Figures 5 and 7 of the drawings in which we have shown our present invention as applied to the type of multiple-axle-drive power transfer mechanism disclosed in our prior application, the housing 11', of slightly modified construction, carries axially aligned, front and rear power output shafts 56 and 83 respectively. Within the housing, spur gear 55' is keyed to shaft 83 for engagement with gear 46 so that said shaft will be constantly driven in a reverse direction with respect to shaft 21. The inner end of shaft 83 carries a fixed bevel gear 84 having a hub extension 85 supported by a suitable roller type anti-friction bearing 86 in a central opening of the web 87 which integrally connects the top and bottom walls of housing 11'.

The other shaft 56 has the reduced inner end 59 thereof journalled by the roller bearing 89 in a recess 90 axially formed in the hub 85 of the gear 84. Upon said end of the shaft the bevel gear 91 having a bearing bushing 92 is loosely mounted and is formed with the hub extension 93 provided with clutch teeth 94 on its periphery.

The gears 84 and 91 are in constant mesh with a bevel gear 95 on the inner end of shaft 96. This shaft is suitably journalled in the end wall of housing 11', preferably in the manner disclosed in our pending application. It will, therefore, be evident that normally the gear 91 will be idly rotated on the shaft end 59 in a reverse direction relative to the direction of rotation of the shaft 83 or in the same direction as the rotation of shafts 21 and 35.

The shaft 56 is provided with clutch member 63 shown in Figure 1 which is adapted to be shifted by fork 67 into clutching engagement with the teeth 94 of gear 91 so that the front output shaft 56 will then be driven in a reverse direction with respect to the rear output shaft 83.

Referring now to Figure 7 of the drawings, shaft 56 is connected with the front axle drive pinion of the hypoid gearing 98 by the propeller shaft 99 while shaft 83 is connected with the rear axle drive pinion of the hypoid gearing 100 by the propeller shaft 101. However, since shaft 83 rotates in a reverse direction to shaft 35 in Figure 1 and shaft 56 is rotated in a reverse direction relative to shaft 83, it is necessary to reverse the arrangement of the hypoid drive gearings from that shown in Figure 6 by turning the axles 75 and 79 end for end in a vertical plane so that the reversed rotation of propeller shafts 99 and 101 will transmit power through said gearing to rotate said axles in the proper direction for forward drive of the vehicle.

It will, of course, be evident from the above that the same front axle output shaft and clutch member is interchangeably used with countershaft 47 and with rear axle output shaft 83 as well as with output shaft 35 when conventional bevel type axle gearing is employed, as previously explained.

The arrangement of Figures 5 and 7 has the advantage that one of the dual rear axles, shown in Figure 8, may be driven from output shaft 35 with the hypoid gearing arranged as seen at 74 in Figure 6 while shaft 21 may be utilized as a power take-off for the operation of an auxiliary machine. Also when bevel type axle gearing is used the housing 11' may remain in attached position and shaft 21 connected to one of the rear axles while shaft 83 serves as a power take-off.

In Figures 8 and 10 of the drawings, the transfer case of Figure 1 is shown as applied to a six-by-six hypoid axle drive, in which, in addition to the propeller shaft connections with output shafts 35 and 56, as shown in Figure 6, a propeller shaft 102 operatively connects output shaft 21 of the transfer case with the hypoid drive gearing 103 of a second rear axle 104.

The invention may also be applied to a six-by-four vehicle drive by merely omitting the front propeller shaft 77, together with housing section 11 and the transfer mechanism therein. Of course, this may also be done in the arrangement of Figure 6 in the case of a single rear axle drive vehicle. By reason of the separability of the front axle transfer mechanism, the transfer case will occupy less space in the vehicle frame and unnecessary wear of said mechanism will be avoided.

However, we may also utilize the alternative rear axle drive shown in Figure 9 of the drawings, in which the drive axle 75 of Figure 8 has been turned end for end in a horizontal plane so as to require reverse rotation. The transfer case of Figure 1 is mounted between the drive axles 75 and 104 in any suitable manner and the output shafts 35 and 56 operatively connected with the hypoid drive gearing of axles 75 and 104 by the propeller shafts 105 and 106 respectively. Shaft 21 may be capped over or utilized for the operation of a compressor or other vehicle accessory, if desired.

Of course, suitable provision is made on the walls of the housing structure of the transfer case for distributing lubricating oil to the bearings of the several gear carrying shafts of the transfer mechanism. For a more detailed disclosure of one such lubricant distributing means reference may be had to our prior patent, above identified.

It will be understood that Figures 6 to 10 inclusive of the drawings are purely diagrammatic and that the transfer case and axle drive gearings may be otherwise relatively arranged than as therein shown, in order to reduce the angularity of the propeller shafts with respect to the vehicle center line to a minimum.

From the foregoing it will be seen that we have herein disclosed several practical embodiments of our power transfer case and drive mechanism which is easily convertible, with the use of a minimum number of mechanical elements, for the purpose of efficiently driving a plurality of vehicle axles equipped with drive gearing of either the hypoid or conventional bevel gear type. By providing means for alternatively mounting the front axle drive shaft 56, which is common to both types of axle gearing, for operative connection with selected elements of the power transmission train, a marked economy in production costs is realized. This desideratum is appreciably furthered by the provision of a single clutch shifting means for effecting such operative connection in both positions of said drive shaft. It will also be noted that our invention provides a power output or take-off shaft in addition to the drive shafts for both types of axle gearing, thereby increasing the range of utility of mechanisms of this kind.

In general, our present invention is characterized by a multiple unit type of transfer case in which the transfer case housing structure, as well as the mounting and arrangement of the several cooperating parts of the mechanism, is of simple, compact and rugged design which contributes greatly to maximum operating efficiency and low maintenance costs.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Power transfer mechanism for spaced vehicle driving axles, comprising a fixed housing structure, power output shafts for the respective axles, one of said shafts being operatively supported in one side wall of the housing structure, power transmission gearing for said shafts within the housing, means for operatively connecting said gearing with a source of power, the opposite side wall of the housing structure being provided with spaced openings in axial alignment with said one power output shaft and with one of the transmission gear elements respectively, said openings removably receiving the other power output shaft and means for releasably establishing a driving connection between said gear element and the latter shaft or between the aligned output shafts.

2. Power transfer mechanism as defined in claim 1, wherein said last named means comprises a single manually shiftable clutch member carried by said second named power output shaft.

3. Power transfer mechanism as defined in claim 1, said last named means including a clutch member splined on the second named power output shaft, a shifting fork operatively mounted on the housing structure, and means for adjustably positioning said fork for actuation of said clutch member in either position of said output shaft.

4. In power transfer mechanism for the operation of different types of vehicle axle drive gearing, a power output shaft adapted for operative connection with the drive gearing of one vehicle axle, a countershaft, meshed gears fixed on said shafts to rotate the same in relatively opposite directions, a second power output shaft adapted for connection to the drive gearing of a second vehicle axle, means for selectively mounting the latter output shaft in axial alignment with said first named output shaft or the countershaft and a single means carried by the second power output shaft shiftable, when said second power output shaft is mounted in axial alignment with the counter shaft, for establishing a driving connection between said countershaft and said second output shaft to drive the output shafts in opposite directions for one type of axle gearing and shiftable, when said second power output shaft is mounted in axial alignment with the first power output shaft, for establishing a driving connection directly between the output shafts to drive said shafts in the same direction for another type of axle gearing.

5. In power transfer mechanism for multiple vehicle driving axles, a power input shaft, a plurality of rear axle driving output shafts, means for driving said output shafts in the same direction from said input shaft, a counter shaft driven from one of said output shafts an additional front axle driving output shaft, and means for mounting said additional output shaft in coaxially coupled relation with said one output shaft or said counter shaft.

6. In power transfer mechanism for hypoid or bevel gear-driven vehicle axles, a fixed housing structure, a power output shaft journalled in one side of said housing structure and adapted for driving connection with one vehicle axle, a counter shaft journalled in said housing structure, constantly meshed gears fixed to said respective shafts, power transfer means including a gear engaged with the gear on one of said shafts and driving said shafts in relatively opposite directions, a second power output shaft adapted for driving connection with a second vehicle axle, means for journalling said second power output shaft in the other side of the housing structure in axial alignment with the counter shaft or with said first named power output shaft, and means for coupling the aligned shafts to optionally rotate the power output shafts in reverse directions or in the same direction.

7. Power transfer mechanism as defined in claim 6, in which said coupling means comprises clutch teeth on corresponding end of the counter shaft and said first named power output shaft, and an axially shiftable clutch member carried by said second power output shaft.

8. Power transfer mechanism as defined in claim 6, in which said coupling means comprises an axially shiftable coupling member carried by the second power output shaft, together with a shifting fork for said member and means mounting said fork on the housing structure for angular adjustment and operative engagement with said coupling member in either selected position of the second power output shaft.

9. Power transfer mechanism as defined in claim 6, in which said means for journaling said second power output shaft in the other side of the housing structure comprises spaced bearing receiving openings in alignment with the counter shaft and the first named power output shaft respectively, together with bearing means carried by the second output shaft and mountable in a selected bearing receiving opening.

10. In a power transfer mechanism, a housing, a drive input shaft journaled in said housing, a first power output shaft journaled in the housing coaxially with said input shaft and means for operably interconnecting said shafts, a first counter shaft, second and third power output shafts journaled respectively in opposite walls of said housing on parallel but laterally displaced axes and projecting oppositely therefrom, a gear on said first counter shaft constantly meshed with gears on said first and second power output shafts respectively, power transmitting means between said second and third power output shafts for rotating said third power output shaft reversely with respect to said second power output shaft and comprising a rotatable second countershaft geared to said second power output shaft and a releasable clutch between the second countershaft and third power output shaft for interrupting the drive to said third power output shaft, said clutch comprising a clutch element carried by said third power output shaft, and means providing a normally closed aperture in the housing wall opposite said second power output shaft for optionally mounting said third power output shaft in coaxial alignment with said second power output shaft and with said clutch element positioned for selective drive connection to said second power output shaft.

11. In the power transfer mechanism defined in claim 10, said housing comprising a main housing and a removable supplemental housing closing a laterally open end of the main housing, and said second counter shaft and third power output shaft being journaled in said supplemental housing.

LAWRENCE R. BUCKENDALE.
BEVERLY W. KEESE.

REFERENCES CITED

The following references are of record in the file of this patent:

UNITED STATES PATENTS

| Number | Name | Date |
|---|---|---|
| 320,752 | Birdsall | June 23, 1885 |
| 638,359 | Schellenbach | Dec. 5, 1899 |
| 1,657,331 | Witherow | Jan. 24, 1928 |
| 1,791,137 | Manville | Feb. 3, 1931 |
| 2,064,262 | Keese | Dec. 15, 1936 |
| 2,162,334 | Herrington | June 13, 1939 |
| 2,173,044 | Ruggles et al. | Sept. 12, 1939 |
| 2,174,187 | Freitag | Sept. 26, 1939 |
| 2,214,805 | Baker et al. | Sept. 17, 1940 |
| 2,223,522 | Kysor | Dec. 3, 1940 |
| 2,256,974 | Dondlinger | Sept. 23, 1941 |
| 2,290,089 | Bock | July 14, 1942 |
| 2,344,388 | Bixby | Mar. 14, 1944 |

FOREIGN PATENTS

| Number | Country | Date |
|---|---|---|
| 27,459 | Great Britain | 1911 |
| 440,693 | France | May 9, 1912 |
| 363,027 | Italy | Sept. 15, 1938 |